(12) United States Patent
Wu et al.

(10) Patent No.: US 9,684,114 B2
(45) Date of Patent: Jun. 20, 2017

(54) BACKLIGHT SOURCE AND DISPLAY DEVICE

(71) Applicant: Boe Technology Group Co., Ltd., Beijing (CN)

(72) Inventors: Yanbing Wu, Beijing (CN); Dongsheng Wang, Beijing (CN); Youmei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/778,651

(22) PCT Filed: Mar. 20, 2015

(86) PCT No.: PCT/CN2015/074689
§ 371 (c)(1),
(2) Date: Sep. 21, 2015

(87) PCT Pub. No.: WO2016/061996
PCT Pub. Date: Apr. 28, 2016

(65) Prior Publication Data
US 2016/0327724 A1 Nov. 10, 2016

(30) Foreign Application Priority Data

Oct. 21, 2014 (CN) .......................... 2014 1 0563530

(51) Int. Cl.
*F21V 8/00* (2006.01)
*G02F 1/1335* (2006.01)
(52) U.S. Cl.
CPC ......... *G02B 6/0038* (2013.01); *G02B 6/0021* (2013.01); *G02B 6/0031* (2013.01); *G02B 6/0068* (2013.01)
(58) Field of Classification Search
CPC ... G02B 6/0031; G02B 6/0038; G02B 6/0021
See application file for complete search history.

(56) References Cited

U.S. PATENT DOCUMENTS 6,474,826 B1 * 11/2002 Tanaka ................. G02B 6/0018
362/23.16
6,975,370 B2 * 12/2005 Yu ........................ G02B 6/0021
349/65

(Continued)

FOREIGN PATENT DOCUMENTS

CN 1523420 8/2004
CN 201053627 4/2008

(Continued)

OTHER PUBLICATIONS

International Search Report and Written Opinion from PCT/CN15/74689 dated Jul. 6, 2015.

(Continued)

*Primary Examiner* — Elmito Breval
(74) *Attorney, Agent, or Firm* — Calfee, Halter & Griswold LLP

(57) ABSTRACT

The present disclosure relates to the field of display technology, and provides a backlight source and a display device, which address the problem that the misalignment readily occurring between the LED strip and the light guide plate results in a light leakage in the light-emitting diodes and hence a reduced performance of the display device. A backlight source comprises a scattering substrate and a light-emitting diode strip, wherein the light-emitting diode strip comprises a circuit board and light-emitting diodes arranged at intervals on the circuit board, and the scattering substrate comprises recesses at a surface corresponding to the light-emitting diode strip, the recesses corresponding one-to-one with the light-emitting diodes, the light-emitting diodes embedded into the recesses. A display device comprises the backlight.

19 Claims, 4 Drawing Sheets

(56) References Cited

U.S. PATENT DOCUMENTS

| | | | |
|---|---|---|---|
| 2004/0080926 A1* | 4/2004 | Chen | G02B 6/0023 362/609 |
| 2004/0095743 A1* | 5/2004 | Yu | G02B 6/0061 362/613 |
| 2005/0013127 A1* | 1/2005 | Tsai | G02B 6/002 362/613 |
| 2005/0030730 A1* | 2/2005 | Ohkawa | G02B 6/0016 362/612 |
| 2007/0127261 A1* | 6/2007 | An | G02B 6/0016 362/608 |
| 2007/0253218 A1* | 11/2007 | Tanabe | G02B 6/0068 362/612 |
| 2008/0002428 A1* | 1/2008 | Byun | G02B 6/0016 362/608 |
| 2008/0043170 A1* | 2/2008 | Ikeda | G02B 6/0016 349/65 |
| 2008/0137373 A1* | 6/2008 | Li | G02B 6/002 362/620 |
| 2009/0015753 A1* | 1/2009 | Ye | G02B 6/002 349/64 |
| 2009/0135623 A1* | 5/2009 | Kunimochi | G02B 6/0016 362/608 |
| 2010/0002465 A1* | 1/2010 | Tsang | G02B 6/0021 362/612 |
| 2010/0014315 A1* | 1/2010 | Fujimoto | G02B 6/001 362/615 |
| 2010/0208496 A1* | 8/2010 | Kim | B29D 11/00663 362/613 |
| 2011/0019437 A1* | 1/2011 | Liao | G02B 6/0061 362/615 |
| 2012/0026751 A1* | 2/2012 | Lin | G02B 6/0021 362/611 |
| 2012/0188792 A1* | 7/2012 | Matsumoto | G02B 6/0036 362/613 |
| 2012/0195065 A1* | 8/2012 | Hyakuta | G02B 6/0043 362/602 |
| 2012/0275183 A1* | 11/2012 | Minami | G02B 6/0036 362/602 |
| 2012/0287677 A1* | 11/2012 | Wheatley | G02B 6/0051 362/627 |
| 2013/0063975 A1* | 3/2013 | Hong | G02B 6/0016 362/608 |
| 2013/0088891 A1* | 4/2013 | Minami | G02B 6/0035 362/611 |
| 2013/0208502 A1* | 8/2013 | Nakayama | G02B 6/0018 362/608 |
| 2014/0198279 A1* | 7/2014 | Yang | G02B 6/0011 349/62 |
| 2014/0204611 A1* | 7/2014 | Yang | G02B 6/0061 362/611 |
| 2015/0085530 A1* | 3/2015 | Fujita | G02B 6/0055 362/626 |

FOREIGN PATENT DOCUMENTS

| | | |
|---|---|---|
| CN | 201420999 | 3/2010 |
| CN | 103323904 | 9/2013 |
| CN | 203442612 | 2/2014 |
| CN | 104298002 | 1/2015 |
| CN | 104298003 | 1/2015 |
| CN | 204155044 | 2/2015 |

OTHER PUBLICATIONS

Office action from Chinese Application No. 201410563530.7 dated Jul. 25, 2016.

Office action from Chinese Application No. 201410563530.7 dated Mar. 8, 2016.

Office action from Chinese Application No. 201410563530.7 dated Oct. 10, 2015.

Office Action from China Application No. 201410563530.7 dated Dec. 16, 2016.

* cited by examiner

| angle (in degrees) | ratio of cone height (in mm) to bottom radius (in mm) | luminous flux (in lumens) |
| --- | --- | --- |
| 53 | 1/0.5 | 0.028195 |
| 60 | 0.86/0.5 | 0.033313 |
| 90 | 0.5/0.5 | 0.037269 |
| 100 | 0.4/0.5 | 0.037395 |
| 120 | 0.3/0.5 | 0.037091 |
| 140 | 0.2/0.5 | 0.023055 |
| 150 | 0.13/0.5 | 0.009845 |

FIG. 10

BACKLIGHT SOURCE AND DISPLAY DEVICE

RELATED APPLICATIONS

The present application is the U.S. national phase entry of PCT/CN2015/074689, filed Mar. 20, 2015, which claims the benefit of Chinese Patent Application No. 201410563530.7, filed Oct. 21, 2014, the entire disclosures of which are incorporated herein by reference.

FIELD OF THE DISCLOSURE

The present disclosure relates to the field of display technology, and more particularly to a backlight source and display device.

BACKGROUND OF THE DISCLOSURE

At present, the liquid crystal display (LCD) has found widespread application in society.

It is well-known that liquid crystals have no capability of emitting light such that a LCD requires a backlight source to fulfill a display process. In the prior art, backlight sources mainly include two categories: edge-lit backlights and bottom-lit backlights. Display devices including edge-lit backlights are widely welcome by the consumers since they are low in power consumption, thin in thickness and low in cost.

In particular, as shown in FIG. 1, the backlight source mainly comprises a light guide plate 50 and a light-emitting diode (LED) strip 60 that is located at a side surface of the light guide plate 50, wherein the LED strip 60 comprises a circuit board 601 and light-emitting diodes 602 that are arranged at intervals on the circuit board 601. With the side surface of the light guide plate 50 generally being planar, the light-emitting diodes 602 on the LED strip 60 may be adhered directly to the side surface of the light guide plate 50.

The inventors have recognized a problem with the prior art that due to a small adhesion area and hence low adhesion between the LED strip 60 and the light guide plate 50, a misalignment readily occurs therebetween such that part of light emitted from the LED strip 60 cannot exit via the light guide plate 50, resulting in light leakage and hence a reduced performance of the display device.

SUMMARY OF THE DISCLOSURE

Embodiments of the present disclosure provide a backlight source and a display device, which address the problem with the prior art that the misalignment readily occurring between the LED strip and the light guide plate results in light leakage in the light-emitting diodes and hence a reduced performance of the display device.

To this end, embodiments of the present disclosure employ the following technical solutions:

According to a first aspect of the present disclosure, there is provided a backlight source comprising a scattering substrate and a light-emitting diode strip, wherein the light-emitting diode strip comprises a circuit board and light-emitting diodes arranged at intervals on the circuit board, and the scattering substrate comprises recesses at a surface corresponding to the light-emitting diode strip, the recesses corresponding one-to-one with the light-emitting diodes, the light-emitting diodes embedded into the recesses.

According to a second aspect of the present disclosure, there is provided a display device comprising the backlight source as recited in the first aspect above.

Embodiments of the present disclosure provide a backlight source and a display device. By providing, at the side of the scattering substrate that corresponds to the light-emitting diode strip, recesses corresponding one-to-one with the light-emitting diodes that are embedded into the recesses, the backlight source allows the light-emitting diode strip and the scattering substrate to be kept at a fixed location, which avoids the problem of light leakage in the light-emitting diode strip resulted from the misalignment between the light-emitting diode strip and the scattering substrate (which is for example a light guide plate), and thus improves the performance of the display device.

BRIEF DESCRIPTION OF THE DRAWINGS

The accompanying figures to be used in description of embodiments of the present disclosure or prior art will be described in brief to more clearly illustrate the technical solutions of the embodiments or the prior art.

Apparently, the accompanying figures described below are only part of embodiments of the present disclosure, from which figures those skilled in the art can derive further figures without making any inventive efforts.

FIG. 10 is a graph showing luminous flux values for conical grooves with different vertex angles.

REFERENCE NUMBERS

10—scattering substrate; 101—recess; 102—upper surface; 103—lower surface; 104—scattering microstructure; 1041—bump; 1042—groove; 105—display layered structure; 106—polarizer layer; 107—array layer; 20—connecting piece; 50—light guide plate; 60—LED strip; 601—circuit board; 602—light-emitting diode; 70—adhesive glue.

DETAILED DESCRIPTION

The technical solutions of embodiments of the present disclosure are described clearly and completely below in connection with the accompanying figures. Apparently, the described embodiments are only part of, and not all of, embodiments of the present disclosure. All further embodiments derived from these embodiments by those skilled in the art without making any inventive efforts are within the protection scope of the present disclosure.

It is to be noted that relative prepositions such as "on", "over", "under", "below", or the like are used herein with respect to a direction along which light emitted from a backlight source propagates, with a layered structure or thin film through which the light first passes being "underlying" and a layered structure or thin film through which the light passes afterwards being "above".

Figure 1:
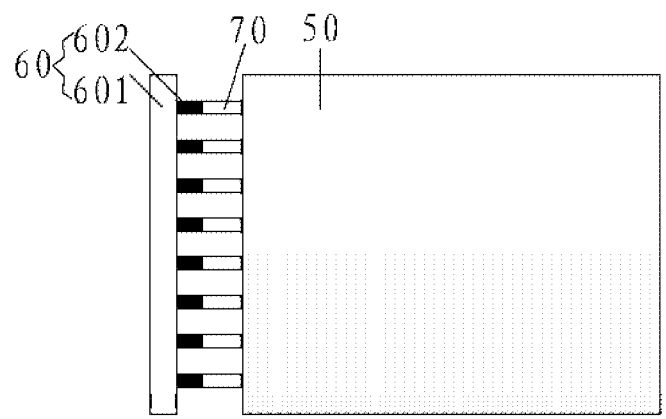
FIG. 1 is a structural schematic diagram of a backlight source according to the prior art.
Figure 2:
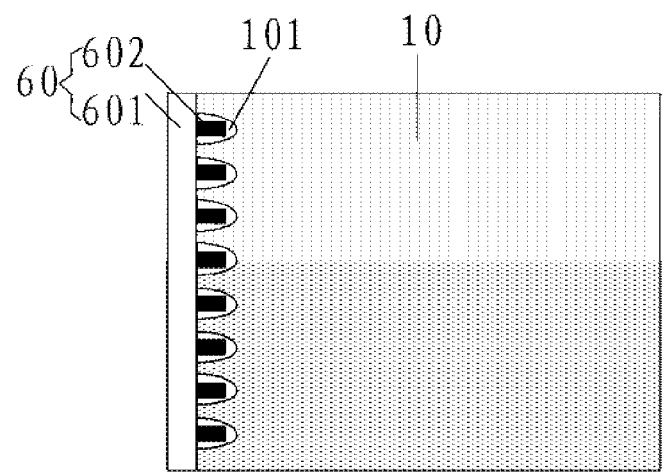
FIG. 2 is a structural schematic diagram of a backlight source according to an embodiment of the present disclosure.

As shown in FIG. 2, according to a first aspect of the present disclosure, a backlight is provided which comprises a scattering substrate 10 and a light-emitting diode strip 60, wherein the light-emitting diode strip 60 comprises a circuit board 601 and light-emitting diodes 602 arranged at intervals on the circuit board 601, and the scattering substrate 10 comprises recesses 101 at a side corresponding to the light-emitting diode strip 60 that correspond one-to-one with the light-emitting diodes 602, with the light-emitting diodes 602 being embedded into the recesses 101.

Figure 3:
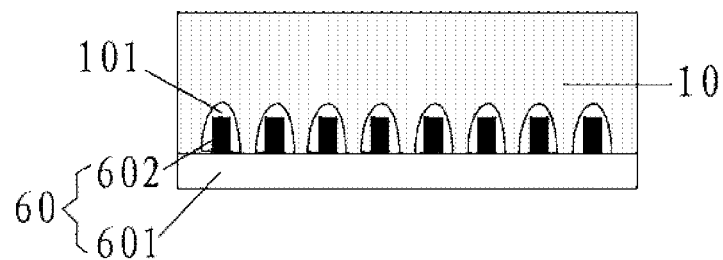
FIG. 3 is a structural schematic diagram of another backlight source according to an embodiment of the present disclosure.

In the backlight source, the light-emitting diode strip 60 may be located at a side surface of the scattering substrate 10 to form an edge-lit backlight as shown in FIG. 2. Alternatively, the light-emitting diode strip 60 may be located at a lower surface of the scattering substrate 10 to form a bottom-lit backlight as shown in FIG. 3. These embodiment are shown as examples and not for purposed of limitation.

Figure 4:
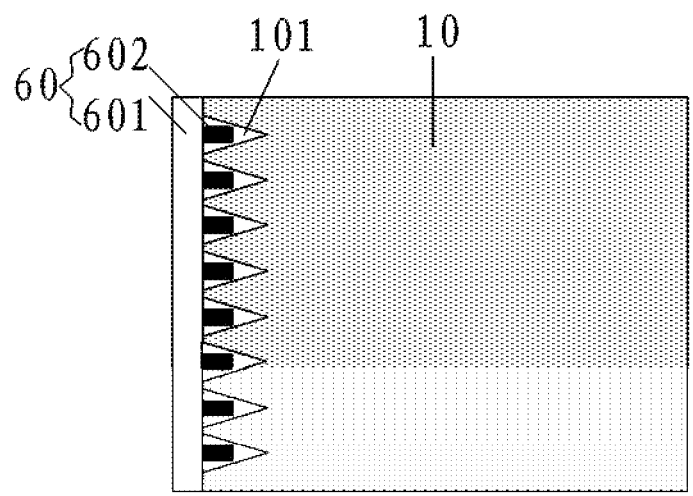
FIG. 4 is a structural schematic diagram of yet another backlight source according to an embodiment of the present disclosure.
Figure 5:
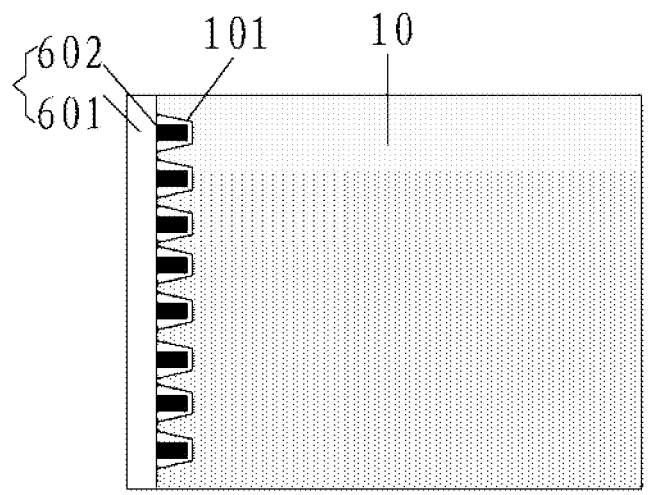
FIG. 5 is a structural schematic diagram of still another backlight source according to an embodiment of the present disclosure.

Optionally, the recesses 101 are in a semi-ellipsoidal shape as shown in FIG. 2. The recesses may also be hemispherical. Alternatively, the recesses 101 may be conical as shown in FIG. 4, or trapezoid shaped platforms as shown in FIG. 5. In embodiments of the present disclosure, the recesses 101 are not limited to any specific shape; moreover, a region between any two neighboring recesses 101 is not limited to any specific shape as well. The surface of the region between two neighboring recesses 101 may be a planar surface or it may be a curved surface. Embodiments of the present disclosure are illustrated in detail taking a planar surface of the region between two neighboring recesses 101 as an example.

It is to be noted that the scattering substrate 10 may be a light guide plate or it may be a display substrate with a scattering function, that is, the scattering substrate 10 may be a substrate having display layered structures (discussed below) formed thereon; however, embodiments of the present disclosure are not limited thereto.

By providing, at the side of the scattering substrate 10 that corresponds to the light-emitting diode strip 60, recesses 101 corresponding one-to-one with the light-emitting diodes 602 that are embedded into the recesses 101, the backlight source according to the embodiment of the present disclosure allows the light-emitting diode strip 60 and the scattering substrate 10 to be kept at a fixed location, which avoids the problem of light leakage in the light-emitting diode strip 60 resulted from misalignment between the light-emitting diode strip 60 and the scattering substrate 10 (which is for example a light guide plate), and thus improves the performance of the display device.

Further, each region of the scattering substrate 10 between every two neighboring recesses 101 is fixed to the circuit board 601 for a better fastening of the light-emitting diode strip 60. Preferably, the scattering substrate 10 and the circuit board 601 may be fixed through adhesion of an adhesive layer. Further preferably, to enhance the adhesion, the circuit board 601 may be provided with a metallic layer (e.g., copper, which is not shown) which is fixed to the scattering substrate 10 through the adhesive layer. Therein, the adhesive layer may be adhesive glue, such as inorganic silicate glue or epoxy resin, or it may be formed by other material that is sticky.

Further, the light-emitting diodes 602 are not in contact with the recesses 101. In this way, there is enough space for heat dissipation for the light-emitting diodes 602, which facilitates improvement of their service life. Preferably, a minimum distance from the light-emitting diodes 602 to the recesses 101 along an optical axis is less than 10 mm. Thus, the light-emitting diodes 602 have an enlarged light mixing space as compared with the prior art design, such that the light emitted from the backlight source is more uniformly distributed.

Figure 6:
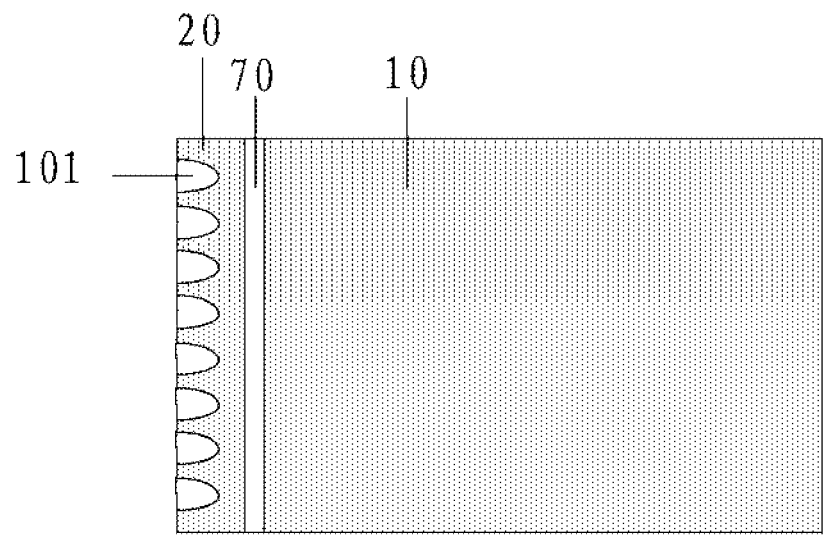
FIG. 6 is a schematic diagram of another scattering substrate according to an embodiment of the present disclosure.

Optionally, the recesses 101 are integrally formed with the scattering substrate 10 as shown in FIGS. 2-5. Alternatively, as shown in FIG. 6, the scattering substrate 10 includes a connecting piece 20 fixed thereto through adhesive glue 70, with the recesses 101 formed on the connecting piece 20. Of course, the connecting piece 20 may be fixed to the scattering substrate 10 in many other ways; this is only for illustration, and is not intended to limit the embodiments of the present disclosure.

According to another aspect of the present disclosure, a display device is provided which comprises any of the backlight sources as recited in the first aspect above. By providing, at a side of the scattering substrate 10 that corresponds to the light-emitting diode strip 60, recesses 101 corresponding one-to-one with the light-emitting diodes 602 that are embedded into the recesses 101, the display device allows the light-emitting diode strip 60 and the scattering substrate 10 to be kept at a fixed location, which avoids the problem of light leakage in the light-emitting diode strip resulted from the misalignment between the light-emitting diode strip and the scattering substrate, and thus improves the performance of the display device.

Figure 7:
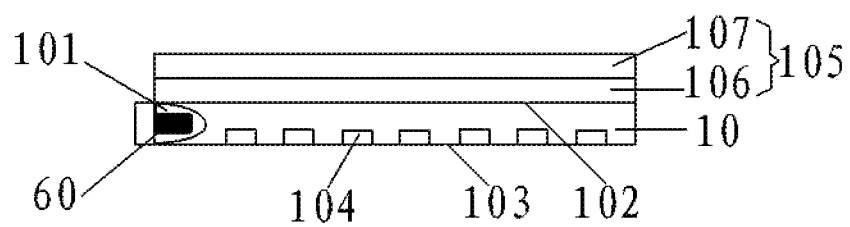
FIG. 7 is a structural schematic diagram of a display device according to an embodiment of the present disclosure.

Further, as shown in FIG. 7, in an embodiment in which the light-emitting diode strip 60 is located at a side surface of the scattering substrate 10, the scattering substrate 10 may be provided with scattering microstructures 104 on a lower surface 103.

By providing the scattering microstructures 104 on its lower surface 103, the scattering substrate 10 allows the light emitted from the light-emitting diodes 602 to enter the scattering substrate 10 from the side surface and to be scattered upon irradiation on the scattering microstructures 104 to form an area light source. The light then exits from the upper surface 102, being more uniform in brightness.

Figure 8:
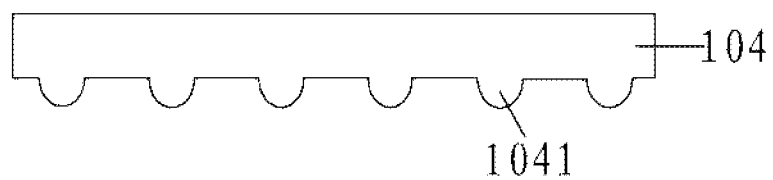
FIG. 8 is a schematic diagram of the scattering substrate of FIG. 7, in which the scattering microstructures comprise bumps.
Figure 9:
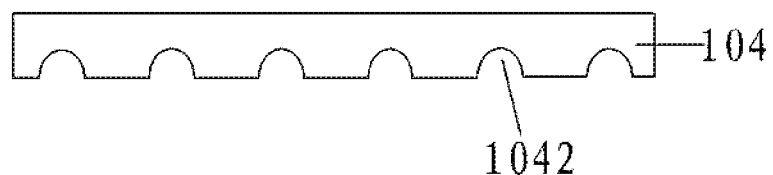
FIG. 9 is a schematic diagram of the scattering substrate of FIG. 7, in which the scattering microstructures comprise grooves.

Further, the scattering microstructures 104 may include bumps 1041 as shown in FIG. 8 or grooves 1042 as shown in FIG. 9.

Preferably, to further improve the scattering capability of the scattering microstructures 104, in embodiments in which the scattering microstructures 104 are grooves 1042, the grooves 1042 may be filled with material whose refractive index is different than that of the scattering substrate 10.

In addition, in embodiments in which the scattering microstructures 104 are bumps 1041, the refractive index of the bumps 1041 may or may not be the same as the scattering substrate 10, for example, and not for purposes of limitation.

Optionally, to reduce the machining difficulty, the bumps 1041 or grooves 1042 may be in hemispherical or conical shapes.

Preferably, in embodiments in which the bumps 1041 or grooves 1042 are in conical shapes, the vertex angle of the cone may range from 90° to 132°. For conical bumps 1041 or grooves 1042 with a vertex angle ranging from 90° to 132°, the light is reflected by the bumps 1041 or grooves 1042 and then exits directly from the upper surface 102 of the scattering substrate 10 without being further reflected. For conical bumps 1041 or grooves 1042 with other vertex angles, when the light irradiates on the upper surface 102 after being reflected by the bumps 1041 or grooves 1042, a part of the light is reflected back into the scattering substrate 10 due to a total reflection, in which case it is possible that the light irradiates on the side surface of the scattering substrate 10 and exits therefrom directly, thus resulting in a loss of light energy.

The aforegoing is verified here taking the conical grooves as an example. In particular, the exemplary scattering substrate 10 is sized of 30×20×0.4 mm and is of PMMA (polymethyl methacrylate) material. The scattering substrate 10 is provided at a side surface with 9 LEDs, each of which is sized of 0.4×0.4×0.1 mm, and the luminous flux collected by the receiving surface in case of conical grooves with different vertex angles is shown in FIG. 10. It can be seen from FIG. 10 that in embodiments in which the vertex angle of the cone is 90°, 100° or 120°, maximum total luminous flux is collected by the receiving surface; in embodiments in which the vertex angle of the cone is 53°, 60° or 140°, a lesser total luminous flux is collected by the receiving surface. In particular, in embodiments in which the vertex angle of the cone is 150°, a minimum total luminous flux is collected. In summary, with the vertex angle of the cone ranging from 90°-132°, better scattering of the light can be achieved.

Referring back to FIG. 7, as mentioned above, the scattering substrate 10 may be a display substrate with a scattering function, in which case a display layered structure 105 may be formed over the upper surface 102 of the scattering substrate 10. It is understood by the skilled person that the display layered structure 105 serves to fulfill a display function of the display device, which may include, for example, a polarizer layer 106 and an array layer 107 formed over the polarizer layer 106. More specifically, the display layered structure 105 may be a layered structure comprising a polarizer layer, thin-film transistors, a pixel electrode layer, a passivation layer, and the like. It will of course be appreciated that there are many more layered structures other than those explicitly described to fulfill the display function. For example, the display device may further comprise a color filter layer and a black matrix layer, for example, and not for purposes of limitation.

It is to be noted that the polarizer layer 106 may be a polarizer that is adhered directly to the upper surface of the scattering substrate 10 or a polarizing film that is formed over the upper surface of the scattering substrate 10. This is a matter of choice, any arrangement suitable to convert the light entering the polarizer layer into polarized light may be employed. Optionally, the polarizer layer 106 is a wire grating polarizing film. To this end, a metallic layer (e.g. aluminum) may be deposited over the scattering substrate 10, and then etched into metallic wires with a width of 20 to 500 nm which are arranged in parallel to form a grating, namely, the wire grating polarizing film. The wire grating polarizing film is greatly reduced in thickness as compared with a polarizer that is adhered to the scattering substrate 10, thus reducing a thickness of the display device.

In this way, the scattering substrate 10 of the display device operates both as a light guide plate and as a display substrate. As compared with the prior art, the thickness of the display device is greatly reduced, and hence the production cost.

Further, to increase the usage efficiency of the luminous body (e.g. the light-emitting diode strip 60) and the brightness of the display device, the scattering substrate 10 is provided, at a side surface where no light-emitting diode strip 60 is arranged, with a reflective layer (not shown). That is, in embodiments in which the luminous body is located at a side surface of the scattering substrate 10, the reflective layer is arranged at the other side surfaces of the scattering substrate where no luminous body is arranged; in embodiments in which the luminous body is located at a lower surface of the scattering substrate 10, the reflective layer (not shown) is arranged at all side surfaces of the scattering substrate 10.

Optionally, in embodiments in which the light-emitting diode strip 60 is located at a side surface of the scattering substrate 10, the scattering substrate 10 may further be provided, at the lower surface, with a reflective layer (not shown) that may cover the scattering microstructures (e.g. the bumps 1041 or the grooves 1042).

It is to be noted that the reflective layer may be a reflecting sheet that is adhered to the surface of the scattering substrate 10 or a reflecting film that is deposited over the surface of the scattering substrate 10. With the reflecting sheet simple to fabricate and the reflecting film thin in thickness, selection of a reflective layer is a matter of choice accordingly.

The description above is only some embodiments of the present disclosure; however, the protection scope of the present disclosure is not limited thereto. Variations or substitutions readily conceived of by those skilled in the art after having read the present disclosure are encompassed within the scope of the present disclosure. Accordingly, the scope of the present disclosure is only defined by the appended claims.

What is claimed is:

1. A backlight source, comprising:
   a light-emitting diode strip comprising a circuit board and light-emitting diodes arranged at intervals on the circuit board; and
   a scattering substrate comprising recesses at a surface corresponding to the light-emitting diode strip, the recesses corresponding one-to-one with the light-emitting diodes, each of the light-emitting diodes being embedded into a respective one of the recesses,
   wherein the scattering substrate comprises a connecting piece on which the recesses are formed, the connecting piece being fixed to the rest of the scattering substrate through adhesive.

2. The backlight source of claim 1, wherein each region of the scattering substrate between every two neighboring recesses is fixed to the circuit board.

3. The backlight source of claim 2, wherein the light-emitting diodes are not in contact with the recesses.

4. The backlight source of claim 2, wherein the scattering substrate is fixed to the circuit board by an adhesive layer.

5. The backlight source of claim 1, wherein the light-emitting diode strip is located at a side surface of the scattering substrate to form an edge-lit backlight.

6. The backlight source of claim 1, wherein the light-emitting diode strip is located at a lower surface of the scattering substrate to form a bottom-lit backlight.

7. The backlight source of claim 1, wherein the scattering substrate comprises one of a light guide plate and a display substrate with a scattering function.

8. A display device comprising the backlight source as recited in claim 1.

9. The display device of claim 8, wherein the light-emitting diode strip is located at a side surface of the scattering substrate, and the scattering substrate is provided with scattering microstructures on a lower surface.

10. The display device of claim 9, wherein the scattering microstructures comprise one of bumps and grooves.

11. The display device of claim 10, wherein the scattering microstructures comprise grooves that are filled with material having a refractive index that is different than a refractive index of the scattering substrate.

12. The display device of claim 9, wherein the scattering substrate is further provided, at the lower surface, with a reflective layer covering the scattering microstructures.

13. The display device of claim 8, wherein the scattering substrate comprises a display substrate with a scattering function, and is provided with a display layered structure on an upper surface of the scattering substrate.

14. The display device of claim 13, wherein the display layered structure comprises a polarizer layer.

15. The display device of claim 14, wherein the polarizer layer comprises one of a polarizer that is adhered directly to the upper surface of the scattering substrate and a polarizing film that is formed over the upper surface of the scattering substrate.

16. The display device of claim 15, wherein the polarizing film comprises a wire grating polarizing film.

17. The display device of claim 8, wherein the scattering substrate is provided with a reflective layer at a side surface where no light-emitting diode strip is arranged.

18. The display device of claim 17, wherein the light-emitting diode strip is located at one of:
 a side surface of the scattering substrate, and the reflective layer is arranged at the other side surfaces of the scattering substrate where no light-emitting diode strip is arranged; and
 a lower surface of the scattering substrate, and the reflective layer is arranged at all side surfaces of the scattering substrate.

19. The display device of claim 17, wherein the reflective layer comprises one of a reflecting sheet that is adhered to the surface of the scattering substrate and a reflecting film that is deposited over the surface of the scattering substrate.

* * * * *